(12) United States Patent
Hall et al.

(10) Patent No.: US 7,719,748 B2
(45) Date of Patent: May 18, 2010

(54) METHOD AND APPARATUS FOR SWITCHING OPTICAL FILTERS

(75) Inventors: Randolph L. Hall, Newbury Park, CA (US); Rand D. Dannenberg, Palm Harbor, FL (US)

(73) Assignee: Teledyne Scientific & Imaging LLC, Thousand Oaks, CA (US)

( * ) Notice: Subject to any disclaimer, the term of this patent is extended or adjusted under 35 U.S.C. 154(b) by 0 days.

(21) Appl. No.: 12/124,094

(22) Filed: May 20, 2008

(65) Prior Publication Data

US 2009/0290207 A1    Nov. 26, 2009

(51) Int. Cl.
*G02F 1/15* (2006.01)
*G09G 3/38* (2006.01)
*G09G 3/19* (2006.01)
*G02F 1/01* (2006.01)

(52) U.S. Cl. .................... 359/265; 345/49; 345/105; 359/277

(58) Field of Classification Search ......... 359/265–270, 359/272–275, 277, 245–247, 254; 345/49, 345/105; 349/182–186; 348/814; 250/70; 438/929
See application file for complete search history.

(56) References Cited

U.S. PATENT DOCUMENTS

| | | | |
|---|---|---|---|
| 4,522,691 A * | 6/1985 | Suginoya et al. ............... 205/50 |
| 5,475,531 A | 12/1995 | Rahmlow et al. |
| 5,930,026 A * | 7/1999 | Jacobson et al. ............. 359/296 |
| 6,822,778 B2 | 11/2004 | Westfall et al. |
| 7,195,353 B2 * | 3/2007 | Blum et al. .................. 351/159 |
| 2002/0019064 A1 | 2/2002 | Hara |
| 2003/0137712 A1 * | 7/2003 | Westfall et al. ............. 359/256 |
| 2003/0156313 A1 * | 8/2003 | Serra et al. .................. 359/265 |
| 2005/0018131 A1 | 1/2005 | Ishak |

OTHER PUBLICATIONS

"Electrochromic Layers" http://students.chem.tue.nl/ifp10/project/electro.htm, Apr. 30, 2008.

* cited by examiner

*Primary Examiner*—Scott J Sugarman
*Assistant Examiner*—Dawayne A Pinkney
(74) *Attorney, Agent, or Firm*—Snell & Wilmer L.L.P.

(57) ABSTRACT

The disclosure relates to a method and apparatus for providing switching optical filter. The switching optical filter provides several functionalities at the same time. For example, the filter can be used to remove photons of undesirable wavelength, such as ultraviolet or infrared, while simultaneously switching from and between one mode to another in order to accommodate changing ambient light conditions. In one embodiment, the disclosure relates to a method for forming an optical filter, the method comprising: forming a first electrode layer on a substrate; forming an ion conductor layer to at least partially cover the first electrode layer; forming an optically transparent layer over the ion conductor layer, the optically transparent layer preventing transmission of photons having a first wavelength while transmitting photons of a second wavelength; and forming a second electrode layer to at least partially cover the optically transparent layer.

19 Claims, 3 Drawing Sheets

METHOD AND APPARATUS FOR SWITCHING OPTICAL FILTERS

BACKGROUND

1. Field

The disclosure relates to a method and apparatus for switching optical filters. More specifically, the disclosure relates to a method and apparatus for providing an optical thin film system which not only prevents transmission of certain wavelengths, it also allows controlling the intensity of the transmitted wavelengths.

2. Related Art

Optical lenses and coatings which filter light have gained substantial popularity in recent years. New manufacturing processes have enabled coating multilayer optical filters on inexpensive transparent substrates and thereby flooding the market with inexpensive sunglasses capable of providing UV protection. High performance optical coatings are used in numerous commercial applications, such as camera lenses, to increase the total transmission of the camera lens. The same technological principles have been applied to window panes in order to provide optically transparent but infrared (heat) blocking windows for reducing the thermal load on buildings. The goal of most optical coatings is to provide a particular light transmission profile (transmission vs. wavelength) that yields the desired performance.

In the eye glass realm, a goal is to provide perfect optical vision while reducing the eyes' exposure to UV and other hazardous rays. In window treatments, the goal is to limit UV rays, infrared rays, and/or to limit visibility through the windows. Ultraviolet radiation falls within a range of wavelengths below visible light, generally between 100-400 nm. The ultraviolet radiation is responsible for fading and solar damage to fabrics. It is desirable to eliminate such radiation via window coatings.

Infrared radiation results in excess heating of interior spaces and is also desirable to eliminate via window coatings. Visible transmittance, on the other hand, may be desired to have different transmission levels depending on the time of day or particular application. It may be desirable for a window to have less transmission during bright daylight hours to avoid glare and eye strain while at night a window might be highly transparent to allow good outside visibility.

A particular type of optical thin film coating is the so-called rugate filter. Rugate filters are optical filters, typically applied as a coating, which act as a notch filter by eliminating a particular range of wavelengths. Rugate filters are different from discrete stacked filters in that the index of refraction of the rugate filter varies as a function of the thickness of the deposited film.

Typically, the optical thickness of the refractive index determines the reflection band position and the amplitude of the variation of the index of refraction determines the reflection bandwidth. Multiple reflection bands can be generated by depositing a series of individual layers each having an index of refraction for each reflection band. Alternatively, multiple index of refraction profiles can be superimposed and deposited in parallel. The use of superposition allows for a better film complexity without increasing the film thickness.

Conventional multilayer coatings and rugate filters are designed by applying well-developed theoretical methods to define index of refraction versus thickness profiles that result in the desired optical performance. The spectral performance of the optical coating is related to the excursion of the index of refraction and physical thickness of the coating. As such, the maximum bandwidth limited to the maximum difference in the refractive indices of the constituent materials.

Moreover, all of these optical coatings and rugate filters are not capable of adjusting for the environment's brightness or darkness. Thus, sunglasses having an optical coating are not useful at night or under variable lighting conditions.

A different type of optical filter includes electrochromic material. Electrochromic devices have been developed to change color in response to radiation or electrical stimulation. For example, electrochromic glasses change opacity through darkening upon closing a circuit which applies a charge to the electrochromic material in the glass. A typical electrochromic material uses chemical material that can reversibly change color when an electric field is applied. A common electrochromic material is aniline which reversibly changes color when a charge is applied. A common application of such electrochromic devices is in automotive rear view mirrors where they are highly reflective during daylight hours and less reflective at night to subdue reflection of headlights from following vehicles.

SUMMARY

The disclosure relates to a method and apparatus for providing switching optical filter. The switching optical filter provides several functionalities at the same time. For example, the filter can be used to remove photons of undesirable wavelength, such as ultraviolet or infrared, while simultaneously switching from and between one mode to another in order to accommodate changing ambient light conditions. In one embodiment, the disclosure relates to a method for forming an optical filter, the method comprising: forming a first electrode layer on a substrate; forming an ion conductor layer to at least partially cover the first electrode layer; forming an optically transparent layer over the ion conductor layer, the optically transparent layer preventing transmission of photons having a first wavelength while transmitting photons of a second wavelength; and forming a second electrode layer to at least partially cover the optically transparent layer; wherein a combination of the first electrode layer, the ion conductor layer, the optically transparent layer and the second electrode defines an electromagnetic circuit and wherein the amplitude of transmission of the second wavelength through the optically transparent layer is affected by activating the optically transparent layer.

In one embodiment, the disclosure relates to a combination of a rugate filter and an EC filter in a single optically transparent layer. In another embodiment, the disclosure relates to the combination of a multilayer optical coating and an EC filter in a single optically transparent layer.

In one embodiment, the disclosure relates to an optical filtration system comprising: a substrate; a first indium-tin-oxide (ITO) layer; an ion storage layer; an ion conductor layer; a filtration layer having a first sub-layer and a second sub-layer, the first sub-layer having an eletrochromic (EC) material and the second sub-layer providing spectrally selectivity to filter out a wavelength; and a second ITO layer, wherein the EC material is selected from the group consisting of $Nb_2O_5$ and $TiO_2$, and wherein the first sub-layer and the second sub-layer define an integrated layer.

In another embodiment, the disclosure relates to an optical device having a first indium-tin-oxide (ITO) layer; an ion storage layer; an ion conductor layer; an optically transparent layer preventing transmission of photons having a first wavelength while transmitting photons of a second wavelength, the optically transmitted layer having at least one EC material; a second ITO layer; wherein the EC material is selected from the group consisting of $Nb_2O_5$ and $TiO_2$ and the EC material allows the reversible variation of the intensity of the transmitted photons while not affecting the blocked range of photons.

In still another embodiment, the disclosure relates to a method for forming an optical device, the method comprising: forming a first electrode layer on a substrate; forming a filter layer over at least a portion of the substrate, the filter layer preventing transmission of photons having a first wavelength and transmitting photons of a second wavelength; forming an ion conductor layer to at least partially cover the filter layer; forming an ion storage layer over the ion conductor layer; and forming a second electrode layer to at least partially cover the ion storage layer; wherein a combination of the first electrode layer, the filter layer, the ion conductor layer, the ion storage layer and the second electrode defines an electromagnetic circuit and wherein the amplitude of transmission of the second wavelength through the filter layer is affected by activating the electromagnetic circuit. The filter layer can comprise $Nb_2O_5$, $TiO_2$, $ZrO_2$, $Ta_2O_5$ and $SiO_2$.

BRIEF DESCRIPTION OF THE DRAWINGS

The disclosure will be discussed with reference to the following non-limiting and exemplary illustrations in which like elements are numbered similarly, and where.

DETAILED DESCRIPTION

Figure 1:
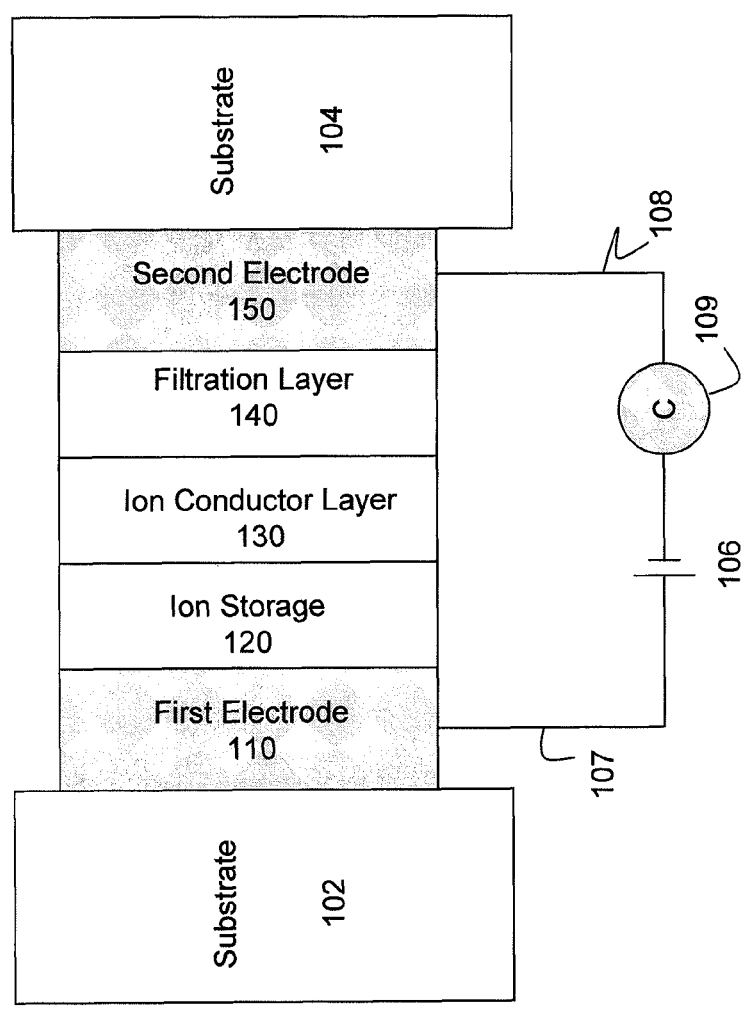
FIG. 1 is a schematic representation of a device according to one embodiment of the disclosure.

FIG. 1 is a schematic representation of a device according to one embodiment of the disclosure. Device 100 of FIG. 1 comprises substrate 102 which can be any suitable transparent or opaque material including glass and plastics. Substrate 102 can be used alone or in combination with optional substrate 104. Layers 110, 120, 130, 140 and 150 can be formed on substrate 102 by coating or by conventional deposition techniques. If substrate 102 is used with substrate 104, then one or more of layers 110, 120, 130, 140 and 150 can be interposed between substrate 102 and substrate 104.

First electrode 110 is coupled to electrical source 106 through line 107. First electrodes 110 and second electrode 150 can be transmissive electrodes or reflective electrodes. In one embodiment, at least one electrode is a transparent electrode. In one embodiment of the disclosure, first electrode 110 comprises indium-tin-oxide (ITO) as a transmissive electrode. Common materials for reflective electrode are silver and aluminum. An electrode can be coated or deposited on substrate 102 through conventional methods. ITO can be formed as a transparent layer which simultaneously acts as an electrode. Electrode layer 110 electrically communicates with source 106 through transmission line 107 and electrode 150 electrically communicates with source 106 through transmission line 108. Controller 109 can be optionally added to control power to electrodes 110 and 150. Source 106 can be a capacitor or a battery. In one embodiment of the disclosure, source 106 is a photovoltaic energy source.

Ion storage layer 120 can be any conventional ion exchange layer such as chlorine-containing solid polymer, titanium trioxide ($TiO_3$) or nickel oxide (NiO). In another embodiment, the ion storage layer comprises $LiNiO_x$ or NiO:OH.

Ion conductor layer 130 (interchangeably, ion conduction layer) is adjacent to the ion storage layer 120. Ion conductor layer 130 acts similar to the electrolyte in a battery by allowing the ions to pass into the adjoining filter layer 140. Organic polymers as well as solid state electrolyte material have been used as ion conductor layers. In one embodiment of the disclosure, the ion conductor layer 130 comprises perfluorinated polyphenylenegermane-poly propylene glycol PMMA-PPG. In another embodiment of the disclosure, the ion conductor layer 130 comprises PMMA-PPG complex with a lithium salt. The PMMA-PPG can be laminated over the ion storage layer 120.

In another embodiment, ion conductor layer 120 comprises $ZrO_2$. In this embodiment, a layer of $ZrO_2$ can be sputtered over the ion storage layer 120. Other ion conducting oxides may also be sputtered in a single coating device.

A typical electrochromic material is able to change its optical properties upon receiving a voltage. The change in optical properties is reversible and the original state is recoverable once the polarity of the voltage is changed. In one embodiment of the disclosure, the electrochromic material is one or more of $Nb_2O_5$, $Ta_2O_5$ and $TiO_2$.

In one embodiment of the disclosure, the electrochromic material is also a rugate filter. A rugate filter acts as a notch or a bandpass filter by preventing certain wavelengths from crossing through the filter. Thus, according to one embodiment of the disclosure, filter 140 is configured to prevent light of predetermined wavelength to pass through optical device 100.

Figure 2:
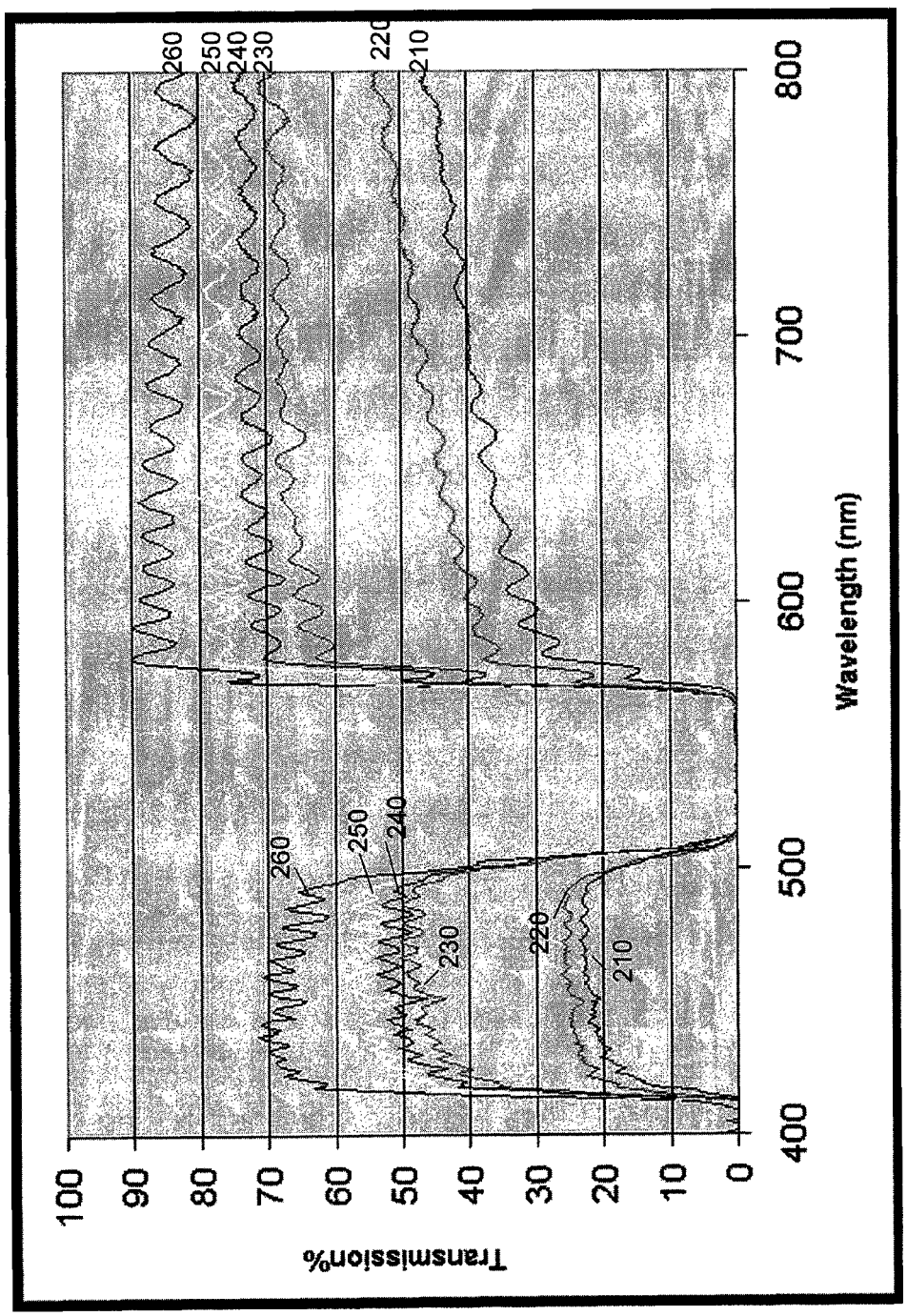
FIG. 2 shows the results of wavelength filtration of a device according to one embodiment of the disclosure.

Electrochromic filter 140 can comprise one or more layers configured to act as an optical filter and provide electrochromic effect when properly activated. In one embodiment, the device is built in the reverse order. That is, a second substrate 104 with a second ITO transparent conductive coating 150 is coated with a rugate filter 140. The rugate filter may be composed of $Nb_2O_5$ and $SiO_2$ materials and constructed to substantially block wavelengths in the 510 nm to 570 nm wavelength region. Further, the rugate filter is designed to have substantially good transmission in the 410 nm to 510 nm and the 570 nm to 800 nm regions. After deposition of the rugate filter, the ion conductor layer 130, ion storage layer 120, and second ITO transparent electrode 110 are added to complete the device. Activation of the device through source 106 and controller 109 reduces the intensity of the transmitted light in the formerly substantially transmissive regions (410 nm to 510 nm and 570 nm to 800 nm), which is also shown in FIG. 2. This effect is completely reversible by reversing the polarity of source 106. The substantially blocked regions, 510 nm to 570 nm are unaffected by the activation of the EC nature of the device. Hence, the wavelengths between 510 nm and 570 nm are always blocked regardless of the polarity of source 106.

Second electrode 150 is positioned over filter 140. As with the first electrode 110, second electrode 150 can be a transmissive electrode or a reflective electrode. In one embodiment of the disclosure, second electrode 150 comprises one or more ITO layers.

Substrate 104 can be optionally included. Substrate 104 can comprise a transmissive material such as plastic or glass. In one embodiment of the disclosure, layers 110, 120, 130, 140 and 150 are interposed between substrates 102 and 104. In one embodiment, where only one substrate is used, optical device 100 comprises substrate 102 and layers (or films) 110-150 coated thereon. In embodiments where two substrates are used, the device may be hermetically sealed to protect against oxidation.

FIG. 2 shows the results of optical filtration through a device prepared according to an embodiment of the disclosure. The device had a design similar to that illustrated in FIG. 1. In FIG. 2, photon rays having a particular wavelength were transmitted through an optical device where the rugate filter and the EC filter were integrated into one device (or a single layer of film). As the EC device was activated, and for wavelengths below about 525 nm, the transmission of photonic rays were consistently reduced to 70% at 260, 60% at 250 all the way down to about 25% at 210. Transmission percentages 210, 220, 230, 240, 250 and 260 are made possible by increasing/decreasing the voltage to the EC filter. Thus, the optical filter of FIG. 1 can be used as sunglasses by increasing or decreasing light transmission therethrough.

In addition to being used as an EC filter, the transmission of certain wavelengths can be entirely eliminated. This is due to the simultaneous action of the EC filter as a rugate filter. Thus, while the EC filter can be adjusted to reduce transmission of light, the same device can be used to prevent passage of any rays with an undesirable wavelength. Referring to FIG. 2, transmission of all wavelengths between 515 and 575 nm is blocked. Regardless of whether the EC filter is adjusted to increase or decrease transmission, all rays having wavelengths between 515 nm and 575 nm are blocked. Thus, a single device can be used both as an optical filter (in this case filtering out the light between 515 nm and 575 nm) and a variable transmission device.

Figure 3:
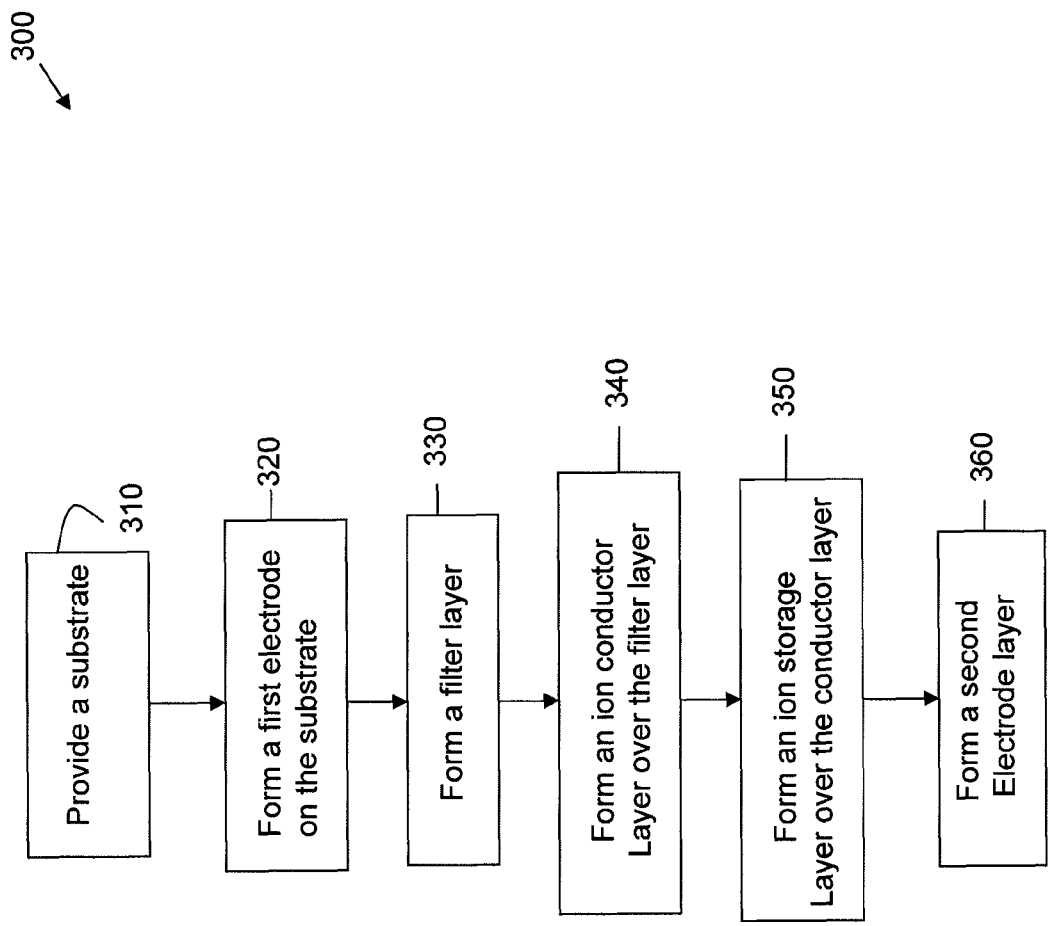
FIG. 3 schematically represents an exemplary method for preparing an optical filter according to one embodiment of the disclosure.

FIG. 3 schematically represents an exemplary method for preparing an optical filter according to one embodiment of the disclosure. Process 300 of FIG. 3 starts with providing a substrate at step 310. Substrate 310 can comprise a transparent plastic or glass material. Next, at step 320, substrate 310 is coated with a first electrode. The first electrode can comprise one or more layers of ITO. ITO may be replaced with other transparent conductors for IR applications.

At step 330, a filter layer is formed over the first electrode. The filter layer can comprise a single homogenous or inhomogeneous layer. Alternatively, the filter layer may comprise a plurality of sub-layers. In one embodiment of the disclosure, the filter layer is an inhomogeneous layer of $Nb_2O_5.SiO_2$. The filter layer can be deposited over the first electrode by any of the conventional methods. In one embodiment, the filter layer is formed over the first electrode by a sputtering process and is vacuum deposited to a thickness of about 8 μm. In an embodiment where a single layer of $Nb_2O_5.SiO_2$ defines the filter layer, a thickness of about 1-2 μm may be sufficient. In other embodiments, multiple layers can be used to form a complex filter layer having a thickness of about 20-30 μm. In still another embodiment, the filter layer may comprise a first sub-layer having EC properties. Thus, the fist sub-layer may comprise $TiO_2$, $Ti_2O_5$, or $TiO_3$. The first sub-layer can be complemented with a second sub-layer which provides optical filtration. Thus, the second sub-layer may comprise $Nb_2O_5$. In one embodiment, a first sub-layer can be coated and a second sub-layer can be coated over the first sub-layer.

In an embodiment of the disclosure, the filter layer functions as both a rugate filter and an optical filter formed from one or more optical coatings. The filter layer retains the notch filtration capabilities while performing optical filtrations, such as adapting to the ambient light. Thus, the filter layer prevents passage of photons rays having a first wavelength while allowing photons of a second wavelength to pass through the filter layer. Moreover, having the EC properties at the filter layer enables adjusting the amplitude (i.e., changing transmission of light) of the photons of the second wavelength. In other words, a system can be used to increase or diminish the amplitude of the photons to increase or decrease the intensity of the light passing through the filter. Any increase or decrease of the intensity would not affect passage of photons of the first wavelength.

In step 340, an ion conductor layer is formed over the filter layer. The ion conductor layer can comprise a sputtered film of $ZrO_2$ or other ion-conducting oxides. The ion conductor layer can be sputtered with a single coating device. In one embodiment of the disclosure, the ion conductor layer comprises a polymer, such as PMMA-PPG complex with a Lithium salt, laminated over the other layers. The ion conductor layer can be formed over the filter layer directly.

At step 350, an ion storage layer is formed over the ion conductor layer. The ion storage layer can be formed from conventional material. Finally, a second electrode layer is formed over the ion storage layer at step 360. The second electrode can comprise conventional ITO material. The second electrode layer may be deposited directly over the ion storage layer or there may be one or more intermediary layers deposited between the electrode layer and the ion conductor layer. Conventional deposition methods can be used for depositing the various layers. Optionally, the ion storage layer and the ion conductor layer can be interposed between the first electrode and the filter layers.

It should be noted that the order of layers represented in FIGS. 1 and 3 are exemplary and non-limiting. An ordinary skilled artisan can change the order, thickness or composition of the layers without departing from the principles disclosed herein.

As discussed in relation to FIG. 1, device 100 can be used with a controller or a switch. The controller can be used to increase or decrease the transmissiveness of light through filter system 100. For example, transmissiveness can be adjusted so as to accommodate for the ambient brightness. Device 100 can be used as eyewear protection and sunglasses. In such applications, the transmissiveness of the sunglasses may be adjusted manually (through controller) or automatically (by a photosensitive sensor) to accommodate the wearer's eyes. Device 100 also protects the wearer's eyes against harmful rays by working as a notch filter to preclude harmful waves (e.g., laser beams) from passing through the glasses.

Similarly, the method shown in FIG. 3 can include formation of a circuit (not shown) by coupling an activation source to the first electrode layer and the second electrode layer. The activation source can comprise any of electromagnetic, mechanical, physical, chemical or optical means which can activate the circuit. For example, the first electrode and the second electrode can be coupled to a voltage source to form an electromagnetic circuit. The electromagnetic circuit can be activated by allowing a current to flow through the layers: first electrode, filter layer, ion conductor layer, ion storage layer and the second electrode. The intensity of the current can be adjusted by a controller in order to increase or decrease the amplitude of the transmitted photons. In other words, the transmissiveness of light through the optical device can be adjusted by changing the current supplied to the electrodes. While the transmission level and light intensity can be adjusted, the current will have no effect on the wavelengths being filtered by the optical device. Thus, regardless of the transmissiveness, photons having an undesired wavelength will not pass through the optical device.

While the specification has been disclosed in relation to the exemplary and non-limiting embodiments provided herein, it is noted that the inventive principles are not limited to these embodiments and include other permutations and deviations without departing from the spirit of the disclosure. For example, while the exemplary embodiments are directed to a combination filter device protecting human eyes from laser, the principles can be used to filter out photons of any undesirable wavelength or wavelengths.

What is claimed is:

1. An optical filtration system comprising:
   a substrate;
   a first indium-tin-oxide (ITO) layer;
   an ion storage layer;
   an ion conductor layer;
   a filtration layer having a first sub-layer and a second sub-layer, the first sub-layer having a first electrochromic (EC) material and the second sub-layer having a second EC material, the second sub-layer providing spectral selectivity to filter out a wavelength; and
   a second ITO layer;
   wherein the first EC material is selected from a group consisting of $TiO_2$, $TiO_5$, and $TiO_3$, wherein the second EC material is $Nb_2O_5$, and wherein the second sub-layer is formed adjacent to the first sub-layer, and the first sub-layer and the second sub-layer define an integrated layer.

2. The optical filtration system of claim 1, wherein the second sub-layer is a rugate filter.

3. The optical filtration system of claim 1, wherein the ITO layer is a transparent layer.

4. The optical filtration system of claim 1, wherein the optical filtration system forms a sunglass device.

5. The optical filtration system of claim 1, wherein the ion storage layer is selected from a group consisting of $LiNiO_x$ and NiOOH.

6. The optical filtration system of claim 1, wherein the substrate defines a transparent material.

7. The optical filtration system of claim 1, wherein each of the first ITO layer, the ion storage layer, the ion conductor layer, the filtration layer defines an independent film.

8. A thin film interference filter comprising:
   a first indium-tin-oxide (ITO) layer;
   an ion storage layer;
   an ion conductor layer;
   an optically transparent filter layer preventing transmission of photons having a first wavelength while transmitting photons of a second wavelength, the optically transparent filter layer having at least two different electrochromic (EC) materials; and
   a second ITO layer;
   wherein each EC material is selected from a group consisting of $Nb_2O_5$ and $TiO_2$ and each EC material allows the reversible variation of the intensity of the transmitted photons while not affecting the blocked range of photons, and wherein the first wavelength defines a bandwidth corresponding to one of visible, IR, near IR or UV range.

9. The thin film interference filter of claim 8, further comprising a substrate.

10. The thin film interference filter of claim 8, wherein the first wavelength defines a bandwidth of about 500 to 570 nm.

11. The thin film interference filter of claim 8, wherein the optically transparent filter layer defines a rugate filter and an electrochromic filter.

12. A method for forming an optical device, the method comprising:
   forming a first electrode layer on a substrate;
   forming a filter layer over at least a portion of the substrate, the filter layer preventing transmission of photons having a first wavelength and transmitting photons of a second wavelength, the filter layer having at least two different electrochromic (EC) materials;
   forming an ion conductor layer to at least partially cover the filter layer;
   forming an ion storage layer over the ion conductor layer; and
   forming a second electrode layer to at least partially cover the ion storage layer;
   wherein a combination of the first electrode layer, the filter layer, the ion conductor layer, the ion storage layer and the second electrode defines an electromagnetic circuit, wherein the amplitude of transmission of the second wavelength through the filter layer is affected by activating the electromagnetic circuit, and wherein the first wavelength defines a bandwidth of about 500 to 570 nm.

13. The method of claim 12, wherein the two different EC materials are selected from a group consisting of $Nb_2O_5$, $TiO_2$, $ZrO_2$, $Ta_2O_5$, and $SiO_2$.

14. The method of claim 12, wherein the electromagnetic circuit is activated by one of an electro-magnetic, a mechanical, a physical, a chemical or an optical change.

15. The method of claim 12, wherein the transmission of photons of the first wavelength through the optical device is substantially unaffected by activating the electromagnetic circuit.

16. The method of claim 12, wherein the step of forming the filter layer further comprises coating a first sub-layer with EC properties and coating a second sub-layer over the first sub-layer, the second sub-layer defining a notch filter.

17. The method of claim 12, wherein ion storage layer is selected from the group consisting of $LiNiO_x$ and NiOOH.

18. The method of claim 12, wherein the amplitude of transmission of the second wavelength through the filter layer is diminished by activating the filter layer.

19. The method of claim 12, wherein the amplitude of transmission of the second wavelength through the filter layer is increased by activating the filter layer.

* * * * *